United States Patent [19]

Grice, Jr.

[11] 4,157,658
[45] Jun. 12, 1979

[54] ENGINE HORSEPOWER MEASUREMENT SYSTEM

[75] Inventor: Karl R. Grice, Jr., Honea Path, S.C.

[73] Assignee: Fiber Controls Corporation, Gastonia, N.C.

[21] Appl. No.: 870,249

[22] Filed: Jan. 17, 1978

[51] Int. Cl.² .................................................. G01M 15/00
[52] U.S. Cl. ................................................. 73/133 R
[58] Field of Search ................. 73/116, 133 R, 117.3, 73/136 R; 364/842

[56] References Cited

U.S. PATENT DOCUMENTS

| | | | |
|---|---|---|---|
| 3,525,861 | 8/1970 | Alexander | 364/842 X |
| 3,686,941 | 8/1972 | Kramasz, Jr. et al. | 73/117.3 |
| 3,978,718 | 9/1976 | Schorsch | 73/117.3 |

Primary Examiner—Jerry W. Myracle
Attorney, Agent, or Firm—Cushman, Darby & Cushman

[57] ABSTRACT

An apparatus for producing an indication of the horsepower produced by a motor, engine or the like in which a load beam mounted on the motor produces a signal which is applied to a torque circuit which includes an A/D converter operating as a dual slope integrating A/D converter to produce a window pulse having a width which varies as a function of detected torque. A tachometer circuit produces a pulse train having a frequency indicating the speed of the motor in revolutions per unit time. The pulses from the tachometer are counted in a horsepower circuit during the window pulse from the torque circuit. Reset and store signals are applied to the counter by a flip-flop responsive to a variable frequency clock and the window pulse. The variable frequency clock drives the A/D converter and can be varied to set the constant K. Seven segment LED displays show the torque, speed and horsepower.

11 Claims, 7 Drawing Figures

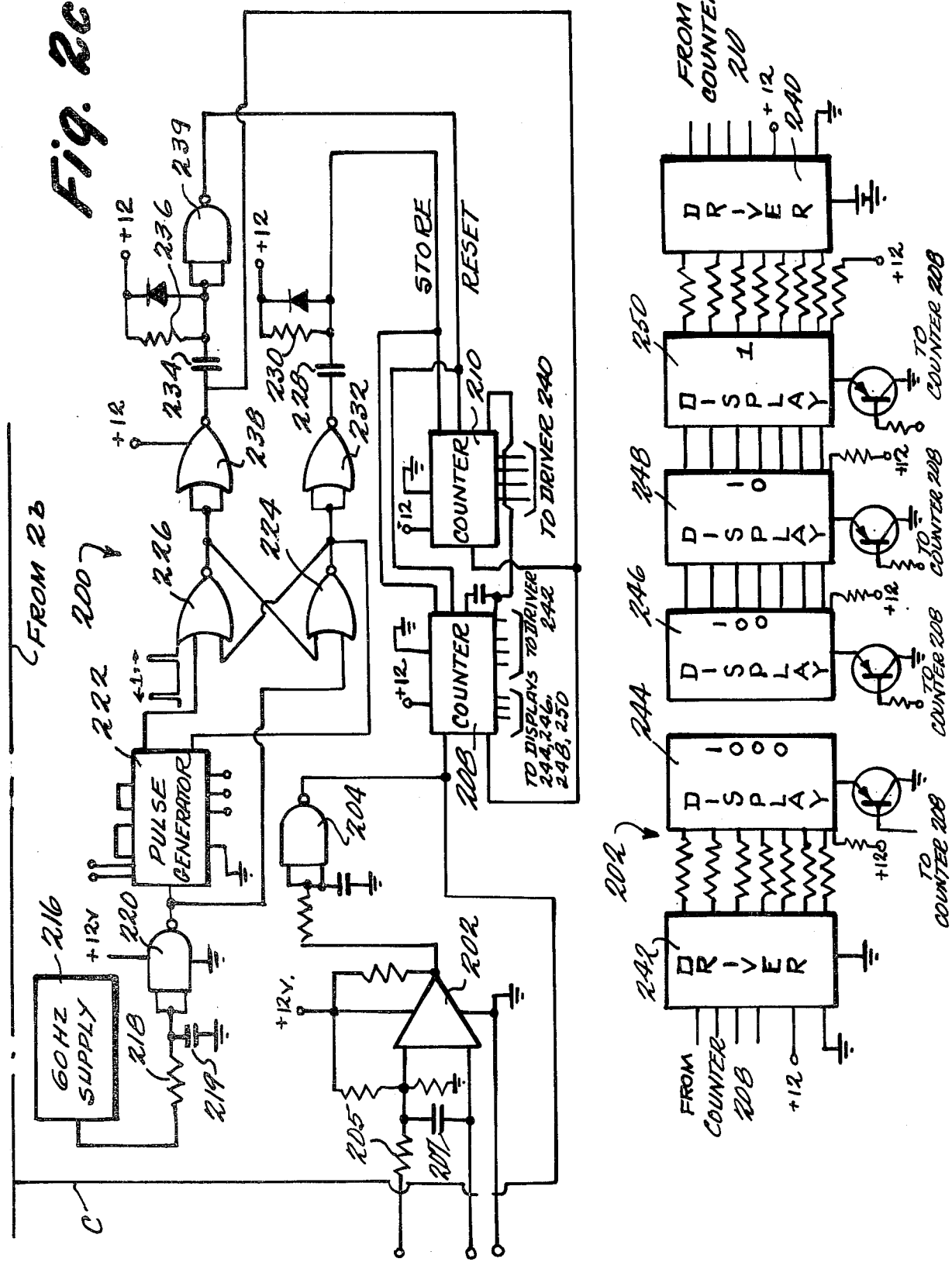

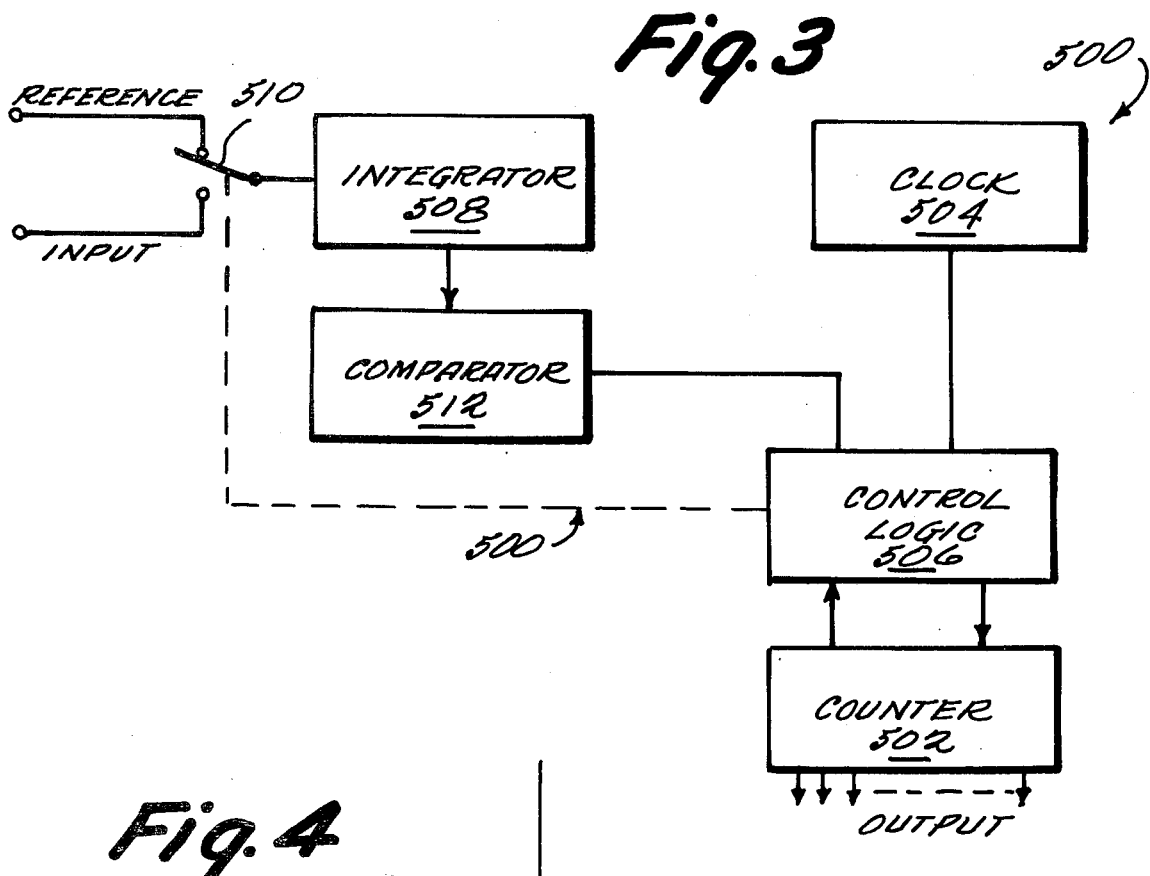
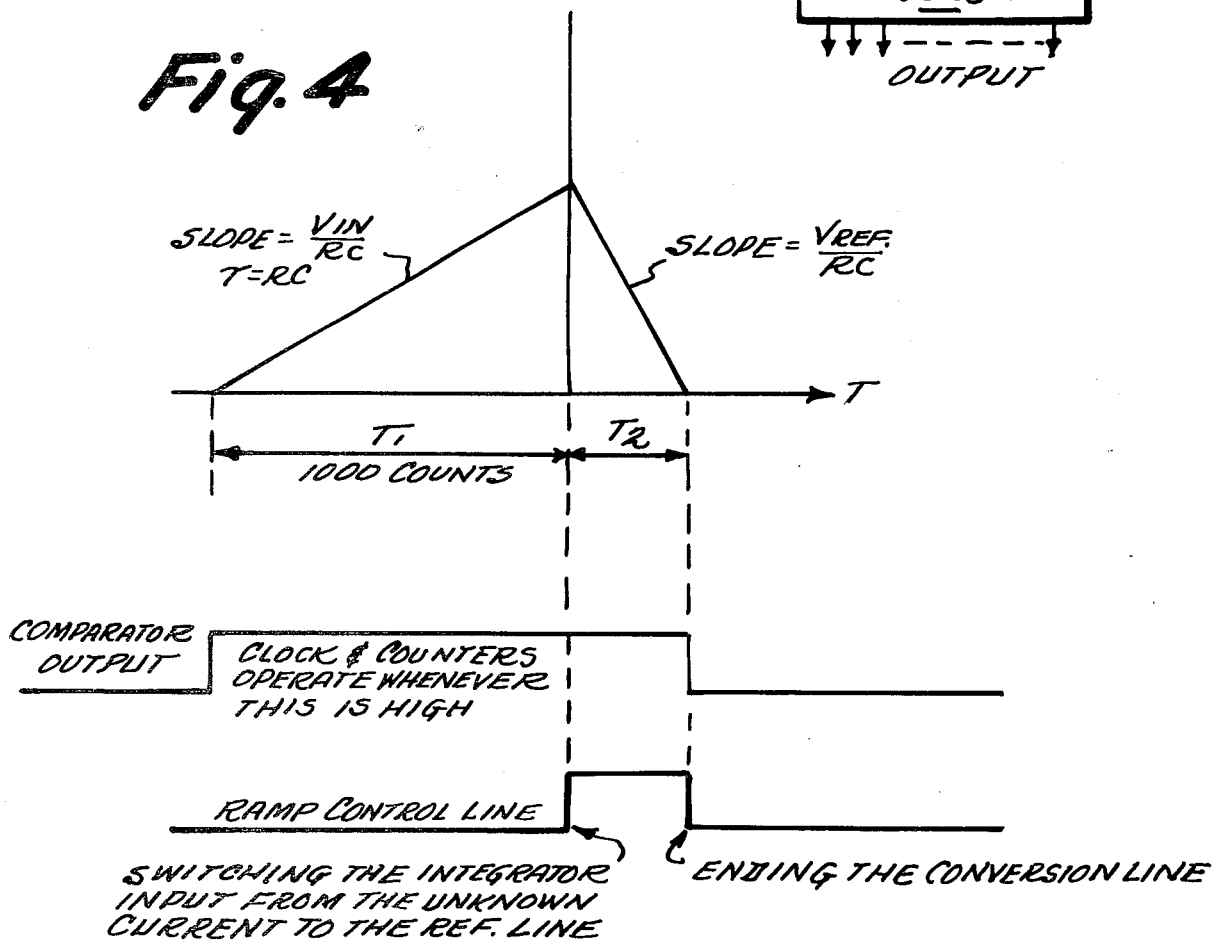

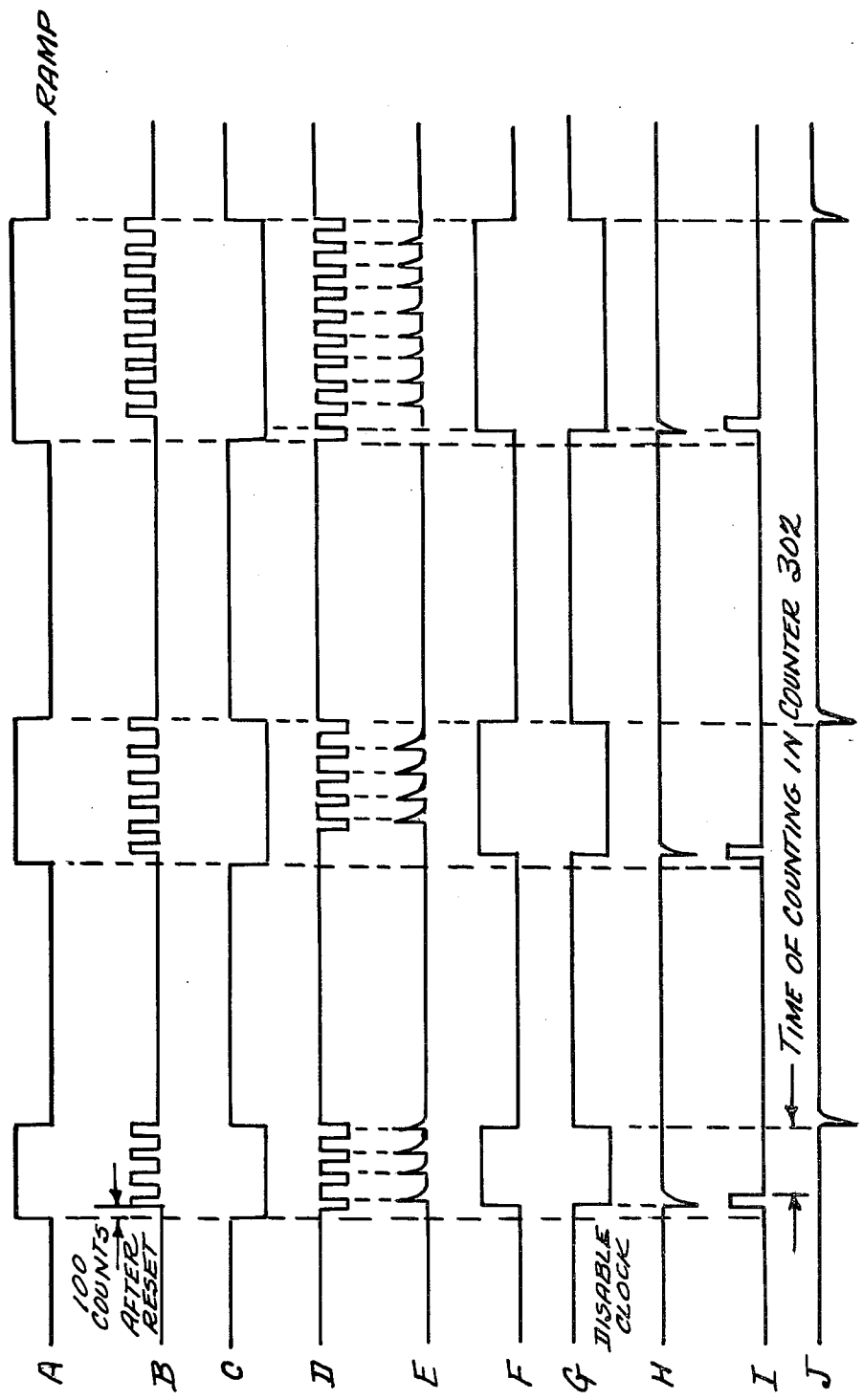

ENGINE HORSEPOWER MEASUREMENT SYSTEM

BACKGROUND AND SUMMARY OF THE INVENTION

The invention relates to an apparatus for producing an indication of the horsepower produced by a motor, engine or the like.

Horsepower is the unit of power commonly used to express the power developed at any given moment by a motor or engine. That power is a product of the torque developed by the engine, the speed of rotation of the engine, i.e., revolutions per unit of time, and a constant. Thus, one way to determine and indicate the horsepower of an engine or motor is to detect both the torque and speed of the engine in revolutions per unit of time and to combine these values to determine the horsepower, i.e., Horsepower = Torque × K(A constant) × Speed in revolutions per unit time.

One way in which this is conventionally accomplished is to detect the torque by means of an eddy current brake coupled to the motor shaft. The current produced in the brake indicates the torque. Speed is measured by coupling a tachometer to the shaft and the signals thus produced are combined to provide an indication of horsepower. Other devices have been developed which utilize strain gauges in order to ascertain the torque and magnetic pickup devices to produce a signal indicating the speed of rotation. These two electrical signals are then multiplied together and displayed to provide an indication of horsepower.

The present invention relates to an improved apparatus for indicating the horsepower produced by a motor. The torque is detected by means of a load beam or cell which measures tensile or compressive forces. Many suitable load cells are available. The D. C. signal produced by the load cell is applied to a torque circuit which provides an output pulse having a width indicating the torque, i.e., the width of the pulse varies with the detected torque. The torque circuit also includes an analog-to-digital converter operating as a dual-slope integrating device for converting the output of the load cell or beam to a digital value which can then be conventionally displayed in a seven segment LED display.

The speed of the motor is also detected, e.g., by means of a conventional magnetic sensor with the output applied to a circuit which produces a train of pulses having a frequency indicating the speed of revolution. The output of the tachometer circuit is also displayed.

The torque circuit and the tachometer circuit are connected to a horsepower circuit which includes a counter connected to the output of the tachometer circuit for counting the pulses produced by that circuit. A clock circuit in the horsepower circuit operates at a variable frequency indicating the constant K, and supplies the pulses counted by the A/D converter in the torque circuit so that the pulse width also varies as a function of the constant K. The horsepower circuit further includes a counter logic responsive to the output of the torque circuit for accumulating a count of the tachometer pulses during the duration of the pulse from the torque circuit. This count then indicates the horsepower and can be conventionally displayed.

Many other objects and purposes of the invention will be clear from the following detailed description of the drawings.

BRIEF DESCRIPTION OF THE DRAWINGS

FIGS. 2a, 2b and 2c show a detailed circuit schematic of the embodiment illustrated in block diagram in FIG. 1;

FIG. 3 shows the elements of the dual-slope integrating A/D converter;

FIG. 4 shows a diagram illustrating operation of the converter in FIG. 3; and

FIG. 5 shows the outputs of several points in the schematic of FIGS. 2a, 2b and 2c indicated by capital letters.

DETAILED DESCRIPTION OF THE DRAWINGS

Figure 1:
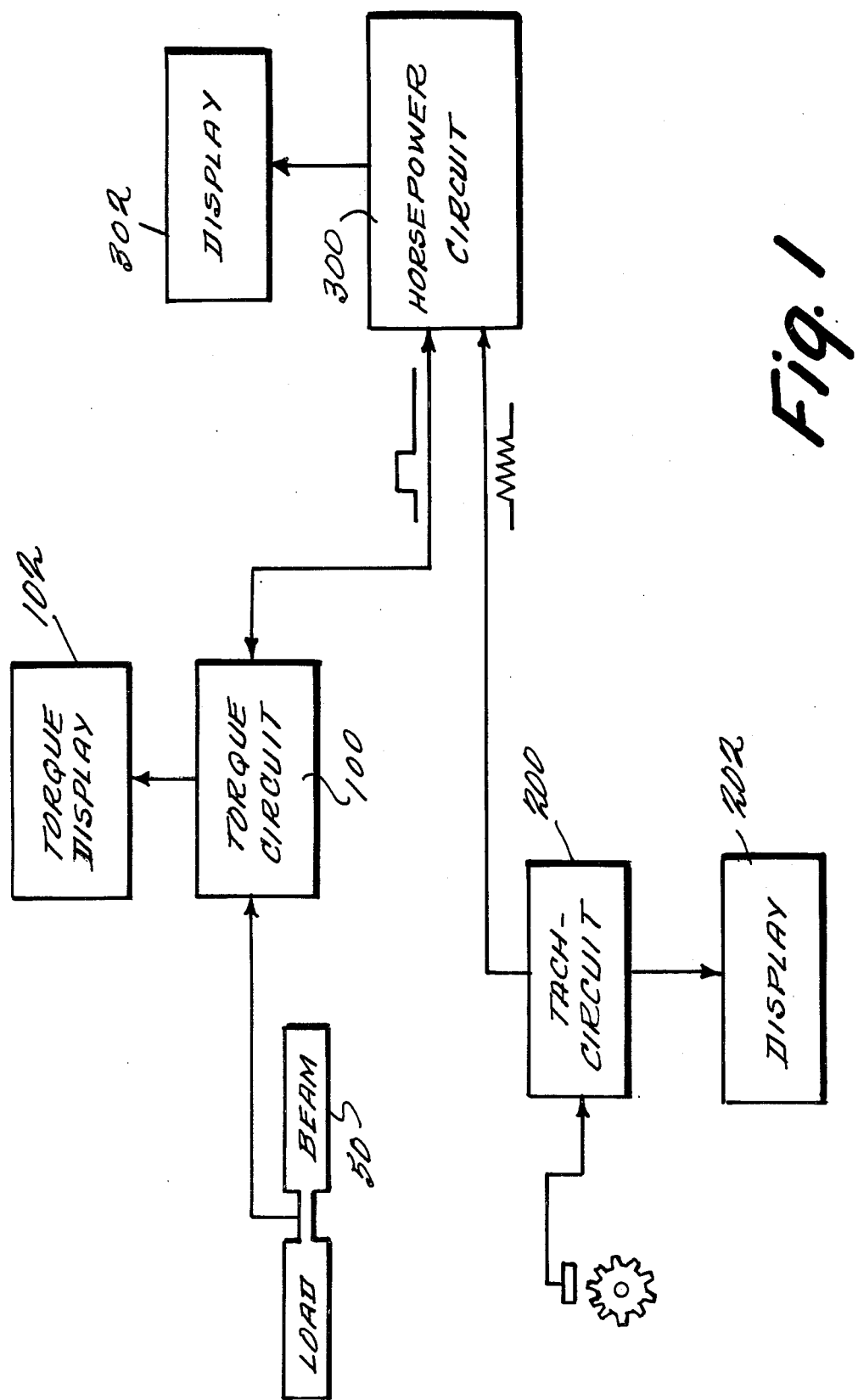
FIG. 1 shows a block diagram of one embodiment of the apparatus of the present invention.

Reference is now made to FIG. 1 which illustrates in block diagram one embodiment of the present invention. A load beam or cell 50 is coupled to the motor or other device whose horsepower is to be determined in order to provide an output indicating the torque produced by the motor. Any suitable cell in that regard can be used. One example of such a cell is the precision load cell Z6 manufactured by HBM G.m.b.H. of Darmstadt, Germany. Other suitable beams can be obtained from BLH Electronics of Waltham, Massachusetts. Such load beams are well known in the art and there is no need to detail the structure thereof in the present application.

Load beam 50 produces a D.C. signal which indicates the current torque being produced by the motor on which the load beam is mounted. This D.C. signal is applied to a torque circuit 100 which includes an analog-to-digital converter operating as a dual-slope integrating A/D converter to convert the D.C. signal to a digital signal which is applied to a display 102 to provide an indication of the torque being produced by the motor or engine at any given time and to produce a RAMP signal, i.e., window pulse, having a width which varies as a function of the detected torque. This variable width RAMP signal is applied to horsepower circuit 300.

A tachometer circuit 200 is connected to a sensor for detecting the speed of rotation of the engine or motor, e.g., a conventional magnetic pickup or the like. Tachometer circuit 200 produces a train of pulses as indicated in FIG. 1 with the frequency of the pulses indicating the speed of rotation. Tachometer circuit 200 is connected to a digital display 202 to provide an output indicating the speed of rotation of the engine or motor. The pulses produced by the tachometer circuit 200 are also connected to the horsepower circuit 300 which includes a counter which counts the pulses applied to circuit 300 from circuit 200, during the time that the pulse from circuit 100 continues. The output of circuit 300 is also displayed on a conventional digital display 302.

Figure 2A:
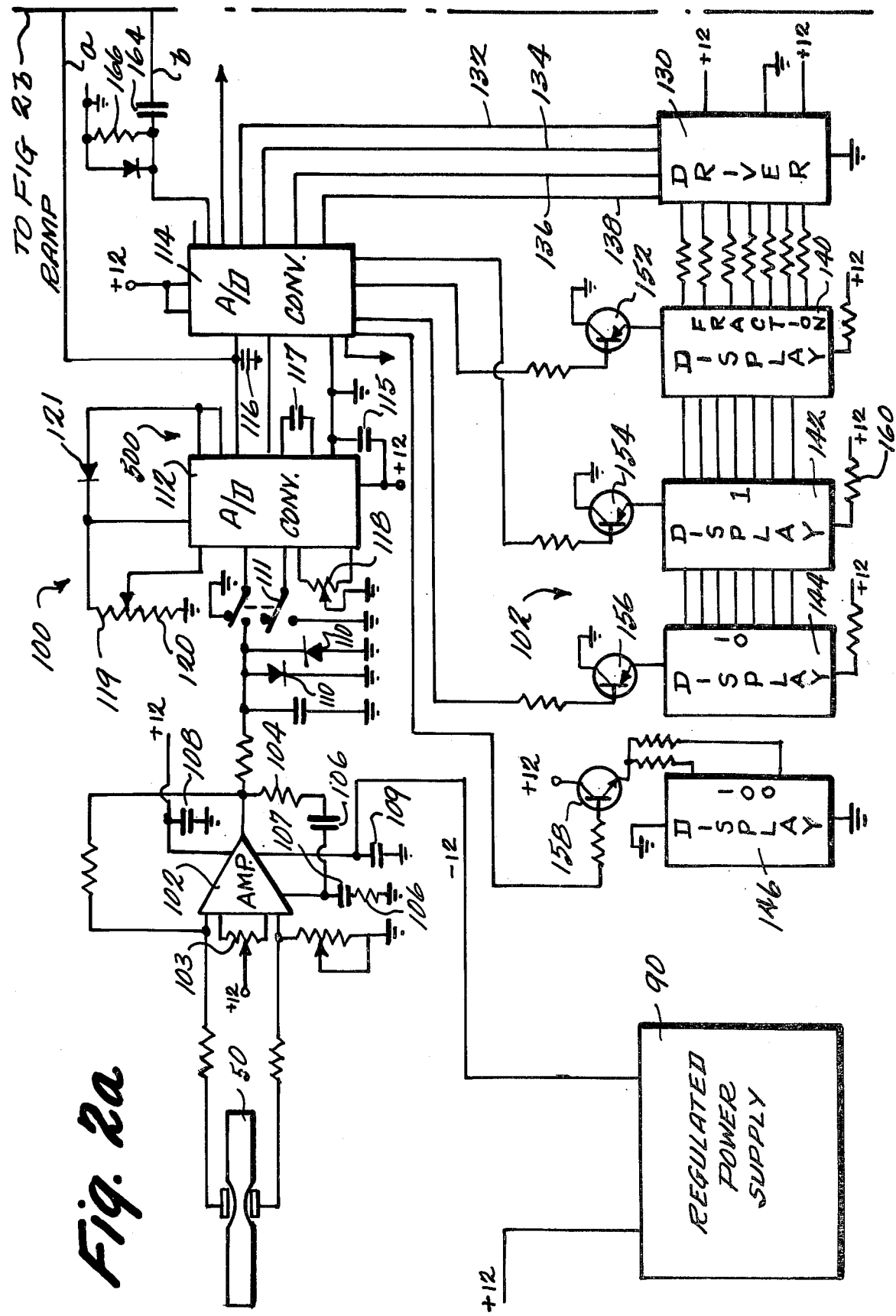
Figure 2B:
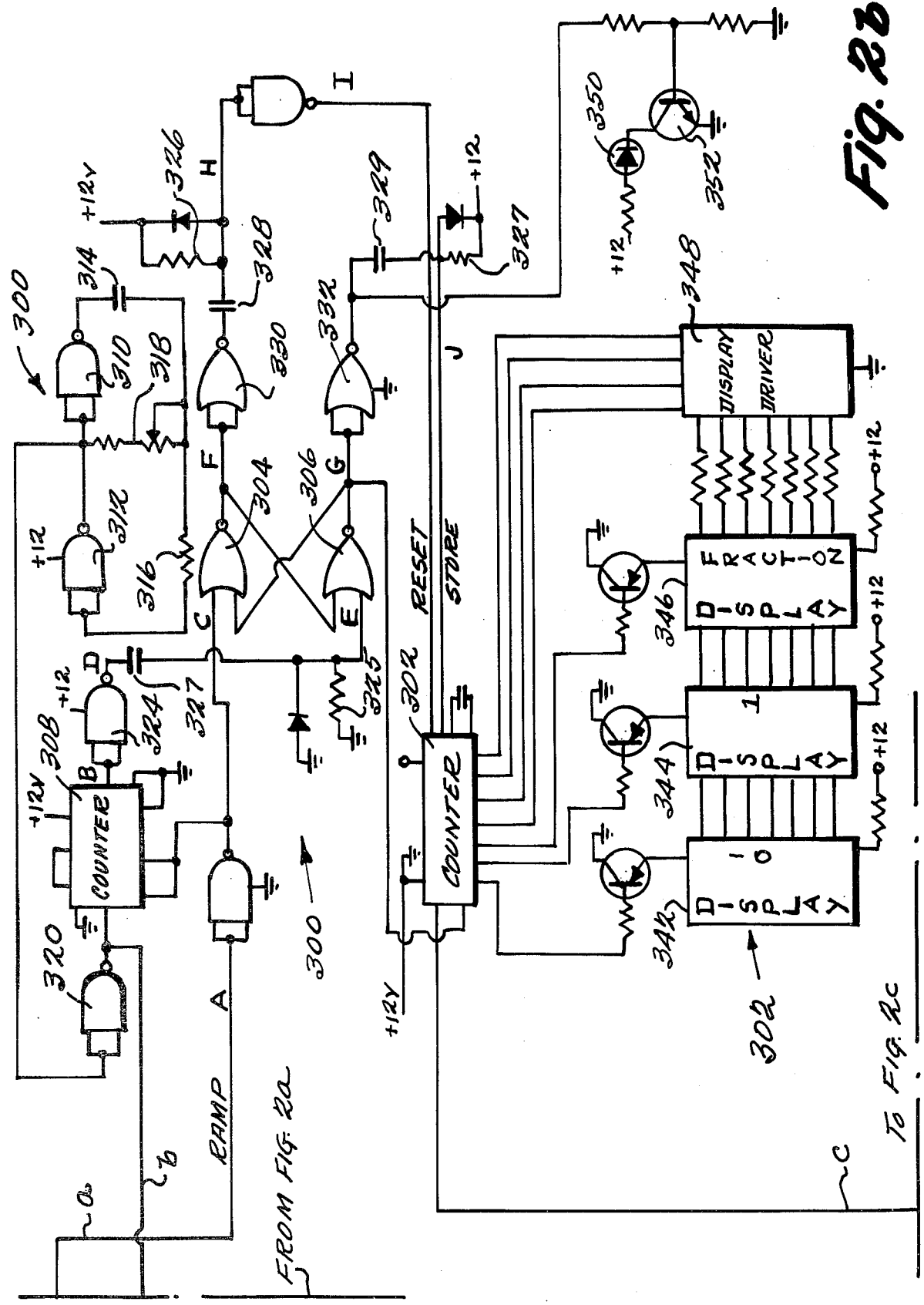

Referring now to FIGS. 2a and 2b, which illustrate in detail the embodiments shown in block diagram in FIG. 1, power for the circuitry of FIGS. 2a and 2b is provided by a regulated source 90 which provides a dual supply ±12 volts. Load beam 50 is connected to an instrumentation amplifier 102 which is used as an input interface to the A/D converter 500. Resistor 103 is used for voltage offset null purposes and resistors 104 and 105 and capacitors 106 and 107 for frequency compensation. Capacitors 108 and 109 provide noise decoupling. Diodes 110 provide 112 protection, i.e., they clamp the input to A/D to about 700 millivolts. Switch 111 permits circuit 100 to operate with an input of either polarity.

Analog-to-digital converter 500 includes two separate chips 112 and 114 which together provide a 3½ digit A/D converter. Chip 112 is an MC 1405 chip and chip 114 is an MC 14435 chip. Chips 112 and 114 include components for operation together as a dual-slope integrating A/D converter as detailed in FIGS. 3 and 4. In this technique, counter 502 within the chips first digitally counts a fixed number of pulses from a clock 504 under the control of logic 506. The input signal to be converted is applied to an integrator 508 within the chips via a switch 510 and is removed when the counters are full (1,000 counts if using MC 1405). The charging is shown in FIG. 4. At this time, the analog signal is removed from integrator 508 and, at this instant, the accumulated charge on the integrating capacitor is proportional to the average value of the input over the counting period. A reference voltage having opposite charge is now applied to integrator 508 by switch 510 so that the amount of time required to return the integrator output to zero as shown in FIG. 4 and as sensed by comparator 512 is a function of the input voltage. The digital counters which were reset at the changeover point start counting again during the discharge. When the integrator output reaches zero, the counters are stopped and the state of the counters digitally represents the analog input.

Referring again to FIGS. 2a, 2b and 2c, the clock input which is counted is derived from the circuit 300 and varies as a function of the constant K which is to be multiplied with the torque and speed. This clock signal is differentiated and applied to an input of chip 114, which, when its counters are full, shifts the line RAMP from low to high producing a variable width window pulse signal which is applied to the circuit 300, the width of the window pulse indicating the detected torque.

Capacitors 115 and 116 are used for high frequency noise decoupling. Capacitor 117 is the integrating capacitor. Resistor 118 serves for zero scale calibration and potentiometer 119 and resistor 120 for full scale. Diode 121 is a clamp diode needed for recovery from negative differential inputs.

Display driver 130 controls the rate of the display of the BCD multiplexed outputs. After the RAMP line goes high, the three BCD latch outputs are multiplexed onto lines 132, 134, 136 and 138.

The display is preferably a four digit seven-segment LED display comprising units 140, 142, 144 and 146. The individual digit unit is selected through the digit lines from chip 114. Each digit select line is normally high and goes low for the individual digit selection and is connected to the base of the associated transistor through a resistor which limits the transistor base current. When the digit select line goes low, the corresponding transistor 152, 154, 156 or 158 conducts and grounds the common cathode of the seven-segment LED so that the selected digit is illuminated. Resistor 160 is used for decimal point display.

Amplifier 202 is used to interface the signal from the magnetic pickup to the remainder of the tachometer circuitry. Amplifier 202 is used as a voltage comparator and operated from a +12 single supply. The signal from the magnetic pickup is in sinusoidal form and the output of amplifier 202 is fed to an inverter buffer 204 via resistor 205 and capacitor 207 which operate as a low pass filter.

The pulses thus produced are applied via buffer 204 to a counter comprising units 208 and 210. A 50 or 60 Hrz 12 volts A.C. signal from source 216 is fed through a low-pass filter comprising resistor 218 and capacitor 219 to inverter buffer 220. Inverter buffer 220 is in turn connected to pulse generator 222 which is programmed to generate a 2 microsecond positive pulse width each second at the output. At the end of each second, pulse generator 222 is reset by a signal from gate 224 which forms with gate 226 a flip-flop circuit. The purpose of this flip-flop is to enlarge the one second time base signal from 2 microseconds to six milliseconds and to generate a reset signal for pulse generator 222. The reason for expanding the time base is to provide for easy generation of store and reset signals for counters 208 and 210.

The STORE signal is obtained by differentiating with capacitor 228 and resistor 230 the output of gate 224 applied via buffer 232. The RESET signal is produced by the output of pulse generator 222 shifting the state of the flip-flop so that the output of gate 226 is applied via gates 238 and 239 functioning as buffers as the RESET signal after differentiation by capacitor 234 and resistor 236.

Display drivers 240 and 242 are used as the output interface to drive the display. Driver 242 drives the thousands display 244 and driver 240 the hundreds, tens and units displays 246, 248 and 250 as described above with regard to the display for the torque indicator.

The pulse train produced by the magnetic pickup is applied to a counter 302 within the horsepower circuit 300. Counter 302 is reset and controlled by a flip-flop comprising gates 304 and 306. The leading edge of the RAMP pulse as shown in FIG. 5 is applied to second counter 308 to reset the counter which then counts the clock pulses generated by the clock comprising gates 310 and 312, capacitor 314, resistor 316 and variable resistor 318. The frequency of the clock can thus be set in accordance with the constant K by varying resistor 318. The output of the clock is differentiated by capacitor 164 and resistor 166 and applied via buffer gate 320 to chip 114 as the clock input. The clock output is also applied to second counter 308 which begins counting after being reset and upon a given count, e.g., 100, applies the clock pulses to gate 324 (signal B in FIG. 5). Gate 324 is connected to gate 306 via the differentiator comprising resistor 325 and capacitor 327 so that the output of the flip-flop is shifted as shown in FIG. 5 to reset counter 302 which now counts the pulses from tachometer circuit 200. The output of the flip-flop is differentiated by resistor 326 and capacitor 328 and resistor 327 and capacitor 329 and applied via buffer gates 330 and 332.

The trailing edge of the window pulse shifts the flip-flop back to its initial condition producing a STORE pulse (signal J in FIG. 5) at the output of the differentiator comprising resistor 327 and capacitor 329. The STORE pulse is applied via buffer 332. The contents of counter 302 are now used to provide a display of units 342, 344 and 346 which are driven by driver 348 as described in detail above.

An LED 350 is illuminated each time the STORE signal is produced, causing transistor 352 to become conductive.

While the above disclosure describes indication of horsepower, it will be understood that any other corresponding unit of power can be alternatively indicated and displayed by varying the clock frequency and hence the constant K.

Many changes and modifications of the above embodiments of the invention can be carried out without departing from the scope of the invention. That scope, therefore, is intended to be limited only by the scope of the appended claims.

What is claimed is:

1. An apparatus for indicating the horsepower produced by a motor comprising:
   a load beam adapted for being mounted on said motor to produce an output signal indicating the torque being produced by said motor;
   torque circuit means connected to said load beam for producing a window output pulse having a width indicating said torque;
   speed means adapted for being mounted on said motor to produce an output signal indicating the speed of said motor in revolution per unit of time;
   tachometer circuit means connected to said speed means for producing a pulse train with the frequency of said train indicating said speed;
   horsepower circuit means connected to said tachometer and said torque circuit means for producing a signal indicating said horsepower including a counter means for counting said pulses and logic means connected to said counter means for causing said counter means to provide an output indicating the pulses counted during the time of said output pulse of said torque circuit means so as to indicate said horsepower,
   wherein said horsepower circuit further includes a variable frequency clock for producing a train of clock pulses, means for applying said clock pulses to said torque circuit means so that the width of said output pulse also varies in accordance with the frequency of said clock pulses, that frequency representing a constant.

2. An apparatus as in claim 1, wherein said counter means has a reset input for resetting said counter means and a store input for applying to an output the count in said counter means and said horsepower circuit means further includes a flip-flop having a first ouput connected to said reset input for resetting said counter means when said flip-flop shifts to a first state and a second output connected to said store input for causing said counter means to apply the count then in said further counter means to said output when said flip-flop shifts to a second state.

3. An apparatus as in claim 2, wherein said horsepower circuit further includes a second counter means connected to said torque circuit means, said clock and said flip-flop for counting pulses from said clock following the leading edge of said output pulse and causing said flip-flop to shift to said first state upon a given count in said second counter means.

4. An apparatus as in claim 3, wherein said flip-flop includes first and second interconnected logic gates.

5. An apparatus as in claim 1, wherein said torque circuit means includes a dual-slope integrating analog-to-digital converter including means defining a reference voltage, means for counting said clock pulses, means for integrating said output voltage to increase a stored value from an initial value until a predetermined count, and thereafter for decreasing said stored value to said initial value at a rate determined by a reference voltage, means for producing said output pulse while said stored value is decreased to said initial value, and means for causing said counting means to count during said output pulse so that the count stored at the end of said output pulse indicates the detected torque.

6. An apparatus as in claim 5, including means connected to said converter for displaying the count in said counting means at the end of said output pulse.

7. An apparatus as in claim 6, including an input interface amplifier connected between said load beam and said converter.

8. An apparatus as in claim 1, including means connected to said torque circuit means for displaying said torque, means connected to said tachometer circuit means for displaying said speed and means connected to said horsepower circuit means for displaying said horsepower.

9. An apparatus as in claim 8, wherein each said displaying means includes a seven-segment LED display and means for driving said display.

10. An apparatus as in claim 9, wherein said torque circuit means includes an analog-to-digital converter.

11. An apparatus for indicating the horsepower produced by a motor comprising:
    a load beam adapted for being mounted on said motor to produce an output signal indicating the torque being produced by said motor;
    torque circuit means connected to said load beam for producing a window output pulse having a width indicating said torque;
    speed means adapted for being mounted on said motor to produce an output signal indicating the speed of said motor in revolution per unit of time;
    tachometer circuit means connected to said speed means for producing a pulse train with the frequency of said train indicating said speed;
    horsepower circuit means connected to said tachometer and said torque circuit means for producing a signal indicating said horsepower including a counter means for counting said pulses and logic means connected to said counter means for causing said counter means to provide an output indicating the pulses counted during the time of said output pulse of said torque circuit means so as to indicate said horsepower,
    wherein said tachometer circuit means includes means for generating a train of timing pulses, a further counter means for counting the pulses from said speed means having a reset input for resetting said further count means and a store input for applying to an output the count in said further counter means and a flip-flop having a first output connected to said reset input for resetting said further counter means when said flip-flop shifts to a first state and a second output connected to said store input for causing said counter means to apply the count then in said counter means to said output when said flip-flop shifts to a second state and means for connecting said generating means to said flip-flop for causing said further counter means to apply the count to said output, and then resetting said further counter means, at the end of each unit of time.

* * * * *